Patented Aug. 7, 1945

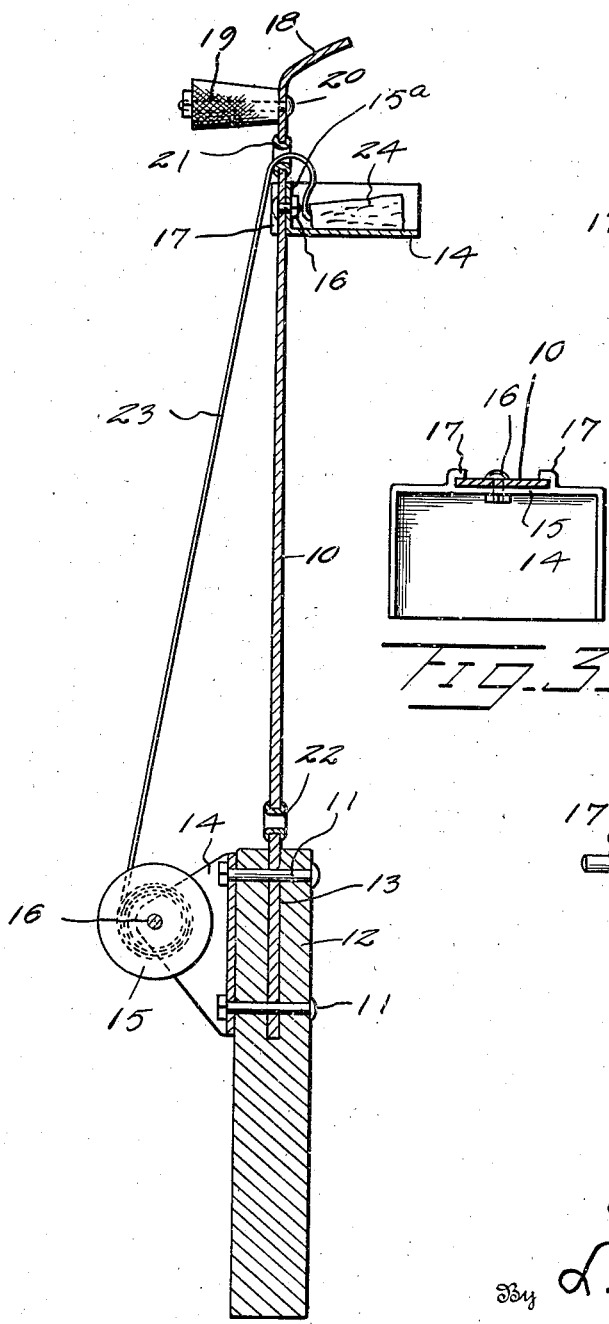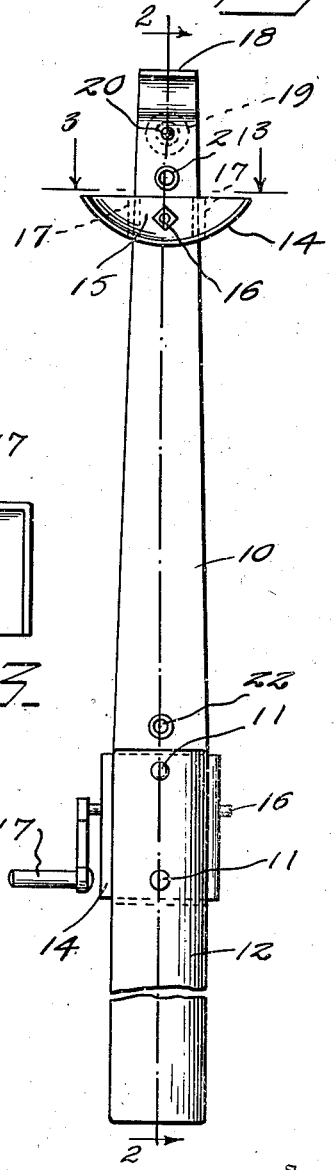

2,381,089

UNITED STATES PATENT OFFICE 2,381,089

CASTING DEVICE

Jacob M. Tweit, Holcombe, Wis.

Application April 5, 1944, Serial No. 529,649

4 Claims. (Cl. 43—19)

This invention relates to a casting device adapted for use to cast a line in fishing and also capable of use as a "bean," "snapper."

It is particularly aimed to provide a structure which will enable casting or application of a fishing line from a sitting position and beneath overhanging branches along a stream.

Further, an object is to provide a structure whereby the casting is accomplished through spring action and may be more accurate and direct.

The more specific objects and advantages will become apparent from a consideration of the description following taken in connection with accompanying drawing illustrating an operative embodiment.

In said drawing:

Figure 1 is a view of the device in elevation;

Figure 2 is a longitudinal sectional view taken substantially on line 2—2 of Figure 1.

Figure 3 is a detail section taken on the line 3—3 of Figure 1.

Referring specifically to the drawing wherein like reference characters designate like or similar parts, 10 designates a steel spring blade preferably slightly tapered, that is, being wider at the lower end than at the upper end. This blade is preferably secured by means of bolts or other fastenings 11 to a suitable handle 12 having a kerf 13 receiving the lower end of such blade. Fastenings 11 also secure in place a suitable mounting or holder 14 for a fisherman's reel 15 having a shaft 16 journaled thereon and operable as by a crank 17. Such reel and its mounting are to be considered as conventional.

Adjacent the free end of the resilient blade 10 and on the side thereof opposite to the reel 15, is a suitably shaped shelf 14, the same for instance being concave as shown and open at the top and outer end. At the inner end it has a wall 15a bolted as at 16 to the blade and which wall terminally has hooks or flanges 17 overlapping the opposite edges of said blade, whereby the shelf cannot turn on the bolt 16 as the pivot.

Above the shelf, the free end of the blade 10 is deflected at 18 over the shelf.

At the opposite side of the blade 10, it is equipped with a suitable knob 19, which may be fastened thereto as by means of a bolt 20.

At suitable locations, the blade 10 has openings therethrough which are preferably equipped with eyelets as at 21 and 22 and through either of the eyelets 21 or 22, the fishing line wound on the reel 15, and shown at 23, may be passed. It will be noted that the bait 24 mounted on one or more hooks as usual, and with the line equipped with a weight, as desired, are adapted to be loosely supported on the shelf 14.

It can now be seen, that the line 23, for instance, is threaded through the eye 21 and baited or weighted at 24. The element 24 is disposed on the shelf 14. The element 24 and line 23 is now ready to be cast and this is accomplished by pulling backwardly on the knob 19, that is toward the left in Figure 2, flexing the spring blade 10. Upon releasing the knob 19, the blade 10 will spring back and the bait or weight 24 will have a slight tendency to rise with the upper end of the blade 10 and deflector 18 forcing the same violently forward, with the result that when the blade 10 and deflector 18 reach their normal positions or slightly beyond due to momentum, the bait or weight 24 is violently projected in the desired direction.

Obviously the device can be used as a catapult, in projecting pebbles or other projectiles placed on the shelf 14, the blade 10 being flexed and released in the manner above described.

Various changes may be resorted to provided they fall within the spirit and scope of the invention.

I claim as my invention:

1. A casting device of the class described comprising a resilient blade adapted to be manually held adjacent one end, a shelf extending from the blade to support an object to be cast, and a knob extending from the opposite side of the blade adjacent the shelf to facilitate tensioning of the blade to project the object.

2. A casting device of the class described comprising a resilient blade adapted to be manually held adjacent one end, a shelf extending from the blade to support an object to be cast, and a knob extending from the opposite side of the blade adjacent the shelf to facilitate tensioning of the blade to project the object, the free end of the blade being deflected in the general direction of and over the shelf.

3. A casting device of the class described comprising a resilient blade adapted to be manually held adjacent one end, a shelf extending from the blade to support an object to be cast, a knob extending from the opposite side of the blade adjacent the shelf to facilitate tensioning of the blade to project the object, the free end of the blade being deflected in the general direction of and over the shelf, a handle at the first-mentioned end of the blade, means securing the handle to the blade, and means to mount a reel also secured to the handle by the first-mentioned means, and said blade having an opening therethrough for passage of a line.

4. A casting device of the class described comprising a resilient blade adapted to be manually held adjacent one end, a shelf extending from the blade to support an object to be cast, a knob extending from the opposite side of the blade adjacent the shelf to facilitate tensioning of the blade to project the object, the free end of the blade being deflected in the general direction of and over the shelf, a handle at the first-mentioned end of the blade, means securing the handle to the blade, means to mount a reel also secured to the handle by the first-mentioned means, said blade having an opening therethrough for passage of a line, said shelf having a wall bearing against the blade, the terminals of said wall being in overlapping relation with opposite edges of the blade, and a fastening extending through the wall and the blade.

JACOB M. TWEIT.